(12) United States Patent
Reith et al.

(10) Patent No.: US 11,971,314 B2
(45) Date of Patent: Apr. 30, 2024

(54) ELECTRIC DRIVE UNIT AND METHOD FOR TEMPERATURE CALCULATION IN AN ELECTRICAL DRIVE UNIT

(71) Applicant: Schaeffler Technologies AG & Co. KG, Herzogenaurach (DE)

(72) Inventors: Jochen Reith, Bühl (DE); Tom Huck, Ottersweier (DE); Jiufang Peng, Karlsruhe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 345 days.

(21) Appl. No.: 17/422,846

(22) PCT Filed: Nov. 4, 2019

(86) PCT No.: PCT/DE2019/100944
§ 371 (c)(1),
(2) Date: Jul. 14, 2021

(87) PCT Pub. No.: WO2020/147870
PCT Pub. Date: Jul. 23, 2020

(65) Prior Publication Data
US 2022/0026286 A1    Jan. 27, 2022

(30) Foreign Application Priority Data

Jan. 17, 2019 (DE) .......................... 102019101163.9

(51) Int. Cl.
*G01K 7/42* (2006.01)
*G01K 13/08* (2006.01)
*H02P 29/60* (2016.01)

(52) U.S. Cl.
CPC ............. *G01K 7/427* (2013.01); *G01K 13/08* (2013.01); *H02P 29/60* (2016.02); *G01K 2205/00* (2013.01)

(58) Field of Classification Search
CPC .......... H02P 29/60; H02P 29/64; H02P 29/66; H02P 29/68; G01K 7/427; G01K 13/08; G01K 2205/00
USPC ........................................................ 318/473
See application file for complete search history.

(56) References Cited

U.S. PATENT DOCUMENTS

| 2008/0094231 A1 | 4/2008 | Hohn et al. |
| 2011/0084638 A1 | 4/2011 | Patel et al. |
| 2012/0217795 A1 | 8/2012 | Hasegawa et al. |
| 2013/0110449 A1 | 5/2013 | Cheng et al. |

(Continued)

FOREIGN PATENT DOCUMENTS

| CN | 107004540 A | 8/2017 |
| CN | 108226734 A1 | 6/2018 |

(Continued)

*Primary Examiner* — Kawing Chan

(57) ABSTRACT

A method calculates temperatures in an electric drive unit. A first temperature detection region has a first temperature and a second temperature detection region has a second temperature. The first temperature is influenced by a first coupling value which is non-linearly dependent on the first temperature and the temperature at the first and second temperature detection regions. The calculations are divided among separate calculation units such that the temperatures can be estimated in real time.

7 Claims, 2 Drawing Sheets

(56) References Cited

U.S. PATENT DOCUMENTS

| | | | | |
|---|---|---|---|---|
| 2014/0210392 A1* | 7/2014 | Berry | ............... | H02P 29/60 |
| | | | | 318/473 |
| 2015/0145255 A1* | 5/2015 | Borisenko | ............ | H02P 29/664 |
| | | | | 310/53 |
| 2017/0115168 A1* | 4/2017 | Kim | ............... | H02K 21/26 |
| 2017/0205365 A1* | 7/2017 | Cavallaro | ............ | G01K 7/425 |
| 2019/0337560 A1* | 11/2019 | Tsubaki | ............ | H02P 29/64 |

FOREIGN PATENT DOCUMENTS

| | | | |
|---|---|---|---|
| CN | 108603913 A | | 9/2018 |
| DE | 19602006 A1 | | 8/1996 |
| DE | 19723393 A1 | | 12/1997 |
| DE | 10155459 A1 | | 5/2002 |
| DE | 10155462 A1 | | 6/2002 |
| DE | 102004006730 A1 | | 8/2004 |
| DE | 102005061080 A1 | | 7/2006 |
| DE | 102008040725 A1 | | 1/2010 |
| DE | 102011085750 A1 | | 5/2012 |
| DE | 102014008642 A1 | | 1/2015 |
| DE | 102014216310 A1 | | 2/2016 |
| DE | 102015226076 A1 | | 6/2017 |
| DE | 102017003610 A1 | | 11/2017 |
| JP | H0654572 A | | 2/1994 |
| JP | 2018022101 A | | 2/2018 |
| WO | 2015101107 A1 | | 7/2015 |
| WO | 2015110107 A2 | | 7/2015 |

* cited by examiner

ELECTRIC DRIVE UNIT AND METHOD FOR TEMPERATURE CALCULATION IN AN ELECTRICAL DRIVE UNIT

CROSS-REFERENCE TO RELATED APPLICATIONS

This application is the U.S. National Phase of PCT Appln. No. PCT/DE2019/100944 filed Nov. 4, 2019, which claims priority to DE 102019101163.9 filed Jan. 17, 2019, the entire disclosures of which are incorporated by reference herein.

TECHNICAL FIELD

The disclosure relates to a method for temperature calculation in an electric drive unit and to an electric drive unit in which the temperature is calculated by such a method.

BACKGROUND

In the case of an electric drive unit, for example comprising an electric motor for driving a motor vehicle, temperature detection in the electric motor may be necessary in order to enable the electric motor to function as reliably as possible. The performance limits of the electric motor can also be used in a more targeted manner through precise temperature detection.

The most reliable is a direct measurement of the temperature at the selected temperature detection region in the electric drive unit. However, an immediate temperature measurement can sometimes be difficult or impossible. For example, due to the installation space or the function, temperature sensors cannot be attached at the intended temperature detection region. A reduction in the number of temperature sensors can also be provided for reasons of cost or in order to simplify the structure. If the temperature cannot be measured directly in the temperature detection region provided, the temperature can be calculated and estimated using a temperature model.

There are a number of different approaches for calculating temperature in an electric drive unit. In US20110084638 A1, a temperature estimation module calculates a motor temperature in an electric motor depending upon a measured oil temperature and the measured electrical current in the stator. In JPH0654572 A, the temperatures in the coils of the electric motor and in the motor flange are calculated using a thermal model of the electric motor. The temperature in the coils is calculated depending upon a temperature-dependent electrical resistance of the coils, with the electrical resistance being determined by measuring the voltage and the current. In WO 2015 101 107 A1, the temperature in an electric motor is estimated depending upon the temperature in power electronics that control the electric motor on the basis of a motor temperature model.

SUMMARY

It is desirable to improve the temperature calculation in an electric drive unit. The number of temperature sensors is to be reduced. The calculation effort for the temperature calculation is to be reduced. The temperature calculation is to be more reliable and more accurate. The temperature calculation is to be carried out faster, preferably in real time.

A method for temperature calculation in an electric drive unit is proposed, having a first temperature detection region with a first temperature and a second temperature detection region with a second temperature, at least the first temperature being influenced by a first coupling value which is non-linearly dependent upon the first temperature. The temperature at the first and second temperature detection regions is calculated by a first calculation module calculating a first temperature value of the first temperature detection region, which calculation is linearly dependent upon a first input value and a second temperature value of the second temperature detection region, which calculation is linearly dependent upon a second input value. A second calculation module calculates the first coupling value at least depending upon the first temperature value and transmits the first coupling value to the first calculation module. The first calculation module, depending upon the first and second input values and the first coupling value calculating a first estimated temperature at the first temperature detection region, and a second estimated temperature at the second temperature detection region.

As a result, temperatures in the first and second temperature detection regions can also be calculated reliably and in real time, which temperatures cannot be directly measured.

The electric drive unit can be used in a vehicle. The electric drive unit can be used in a hybrid module, in particular in a P2 hybrid module. The electric drive unit can comprise an electric motor with a stator and a rotor. The electric motor can be controlled by power electronics.

The temperature can be calculated in real time. The first or second estimated temperature can be the highest temperature, for example the hotspot temperature, in the electric drive unit, for example in the stator. The first or second estimated temperature can be the temperature of the magnets in the rotor. The first or second estimated temperature can be the temperature in the power electronics.

The second input value can correspond to the first input value or be different therefrom. The number of input values can be the same as or different from the number of calculated temperature values.

The first input value can be a first thermal power, in particular a first power loss, and/or the second input value can be a second thermal power, in particular a second power loss. The first and/or second input value can in turn depend upon a respective initial value, for example on an electrical current. This dependency can be established by at least one lookup table and/or an analytical function. A translation module can convert the initial value into a respective input value.

The first coupling value may characterize a heat flow at least with respect to the first temperature detection region.

The first coupling value may be dependent upon the first and second temperature values.

The first and second temperatures may be dependent upon one another via the first coupling value. The coupling value can indicate a heat flow between the first and second temperature detection regions.

The first and second temperature detection regions may be heat-effectively coupled to one another by a coupling region, and the first coupling value may be a variable characterizing the heat flow in the coupling region.

The first coupling value can be a heat flow quantity. The first coupling value can also be a thermal resistance. The first coupling value can be dependent on a rotational speed and/or a speed of a component comprising the coupling region.

In an embodiment, the first calculation module performs a linear calculation of the first temperature value at least depending upon the first input value and the second calculation module performs a non-linear calculation of the first coupling value at least dependent upon the first temperature value. The first calculation module can perform an RC network model formation and/or a model order reduction from a numerical modeling, for example an FEM. The second calculation module can assign the first coupling value to the first and/or second temperature value using at least one lookup table and/or using an analytical function.

The temperature may be calculated taking into account at least one first temperature measurement by including a closed control loop. This allows the accuracy of the respective estimated temperatures to be increased. Further temperature measurements can be recorded and taken into account.

The first calculation module may take into account the first temperature measurement when calculating the first and second estimated temperatures by adjusting the first and second estimated temperatures depending upon a deviation between a first temperature calculation value and the first temperature measurement. The first calculation module can include a state observer, for example according to Luenburger.

The temperature calculation can include an open control loop, in particular with redundant temperature measurement The electric drive unit may have an electric motor and power electronics that control it, and the first and second temperature detection regions may each be assigned to the electric motor and/or the power electronics.

At least one of the aforementioned objects is achieved by an electric drive unit in a vehicle, in which the temperature is calculated at a first and second temperature detection region by a method having at least one of the above features.

BRIEF DESCRIPTION OF THE DRAWINGS

Further advantages and advantageous embodiments result from the description of the figures and the drawings.
Specifically.

DETAILED DESCRIPTION

Figure 1:
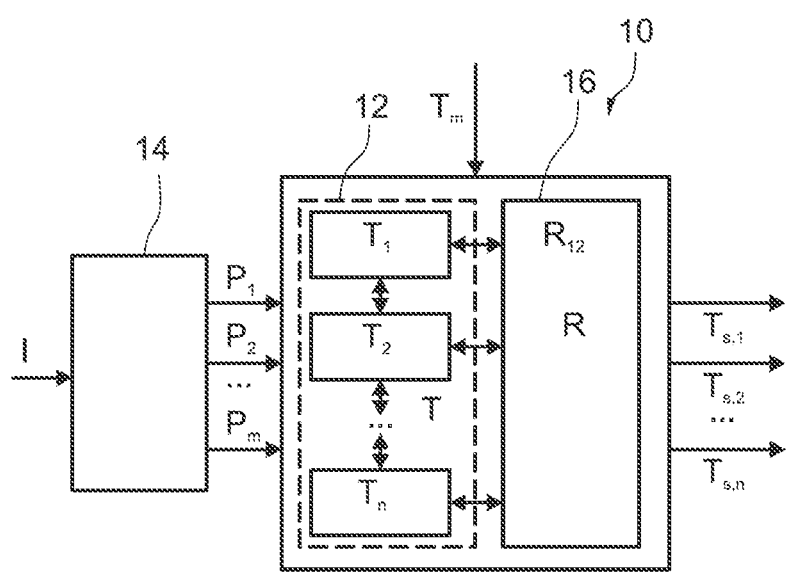
FIG. 1: shows a block diagram of a method for temperature calculation in a specific embodiment.

FIG. 1 shows a block diagram of a method 10 for temperature calculation. The electric drive unit can be used in a vehicle, in particular in a P2 hybrid module. The electric drive unit can comprise an electric motor with a stator and a rotor and the electric motor can be controlled by power electronics.

The electric drive unit can have a first temperature detection region with a first temperature and a second temperature detection region with a second temperature. Further temperature detection regions can be provided. Multiple temperatures can also be assigned to a temperature detection region. The number n of temperatures to be detected can be greater than the number of temperature detection regions.

The first temperature and the second temperature can be mutually dependent on one another via a first coupling value R12 that is nonlinearly dependent on the first and second temperature. The first and second temperature detection regions are heat-effectively coupled to one another by a coupling region and the first coupling value can be a quantity characterizing the heat flow in the coupling region, for example a thermal resistance or a heat flow itself.

The temperature in the first and second temperature detection regions is calculated by a first calculation module 12 calculating a first temperature value T1 of the first temperature detection region, which calculation is linearly dependent upon a first input value P1 and a second temperature value T2 of the second temperature detection region, which calculation is linearly dependent upon a second input value P2. The second input value P2 can correspond to the first input value P1 or be different therefrom. The first input value P1 can be a first heat output, in particular a first power loss, and the second input value P2 can be a second heat output, in particular a second power loss. The first and second input values P1, P2 can in turn depend upon a respective initial value, for example on an electrical current I. This dependency can be assigned by a translation module 14, for example having a lookup table and/or an analytical function.

The first calculation module 12 can also calculate further temperature values up to Tn on the basis of the input values P1 to Pm. The number of temperature values n can be the same as or different from the number m of input values. The respective temperature values T1 to Tn depend linearly on the input values P1 to Pm and the first calculation module 12 carries out a linear calculation to obtain the respective temperature values T1 to Tn based on the input values P1 to Pm.

The first temperature and the second temperature are mutually dependent on one another, for example via the first coupling value R12, which is non-linearly dependent upon the first and second temperatures. The other temperatures are also dependent upon the respective coupling values R, in particular on each other. The coupling values R are again non-linearly dependent upon the temperature. A second calculation module 16 calculates the first coupling value R12 as a function of the first temperature value T1 and the second temperature value T2 and outputs the first coupling value R12 to the first calculation module 12. Correspondingly, the further coupling values R are calculated as a function of the respective temperatures and transferred to the first calculation module 12. The second calculation module 16 takes into account the non-linearities present between the temperature values T or influencing the temperature values T and that can be described via the respective coupling value R.

The first calculation module 12 calculates, depending upon the first input value P1, the second input value P2 and the coupling value R12, a first estimated temperature Ts,1 at the first temperature detection region and a second estimated temperature Ts,2 at the second temperature detection region. Overall, estimated temperatures Ts,1 to Ts,n can be calculated. This division of the calculation via a first calculation module 12 performing the linear calculation and the second calculation module 16 performing the non-linear calculation can also accurately and quickly calculate temperatures at the first and second temperature detection regions that are not accessible for direct temperature measurement.

While the first calculation module 12 enables a fast calculation, the second calculation module 16 takes into account non-linearities and thereby increases the accuracy of the temperature calculation. Although the calculation in the second calculation module 16 is more complex, it is limited in scope as a result of the separation of the linear calculation in the first calculation module 12. The temperature can thus be calculated more accurately and in real time.

The first or second estimated temperatures Ts,1, Ts,2 can be the highest temperature, for example the hotspot temperature, in the electric drive unit, for example in the stator. The first or second estimated temperatures Ts,1, Ts,2 can be the temperature of the magnets in the rotor. The first or second estimated temperatures Ts,1, Ts,2 can also be the temperature in the power electronics.

The temperature is calculated in the first calculation module 12 taking into account at least one first temperature measurement Tin by including a closed control loop. The first calculation module 12 takes into account the first temperature measurement Tm when calculating the first and second estimated temperatures Ts,1, Ts,2 by adjusting the first and second estimated temperatures Ts,1. Ts,2 depending upon a deviation between a first temperature calculation value and the first temperature measurement Tm. This allows the accuracy of the respective calculated estimated temperatures Ts,1 to Ts,n to be increased.

The first calculation module 12 can include a state observer, for example according to Luenburger. The calculation of a non-measurable temperature, which is assigned to the first estimated temperature Ts,1, is controlled by the amount of the deviation between a measurable temperature, which corresponds to the first temperature measurement Tm, and a first temperature calculation value determined by the first calculation module 12 at the temperature detection region of the measured temperature.

Figure 2:
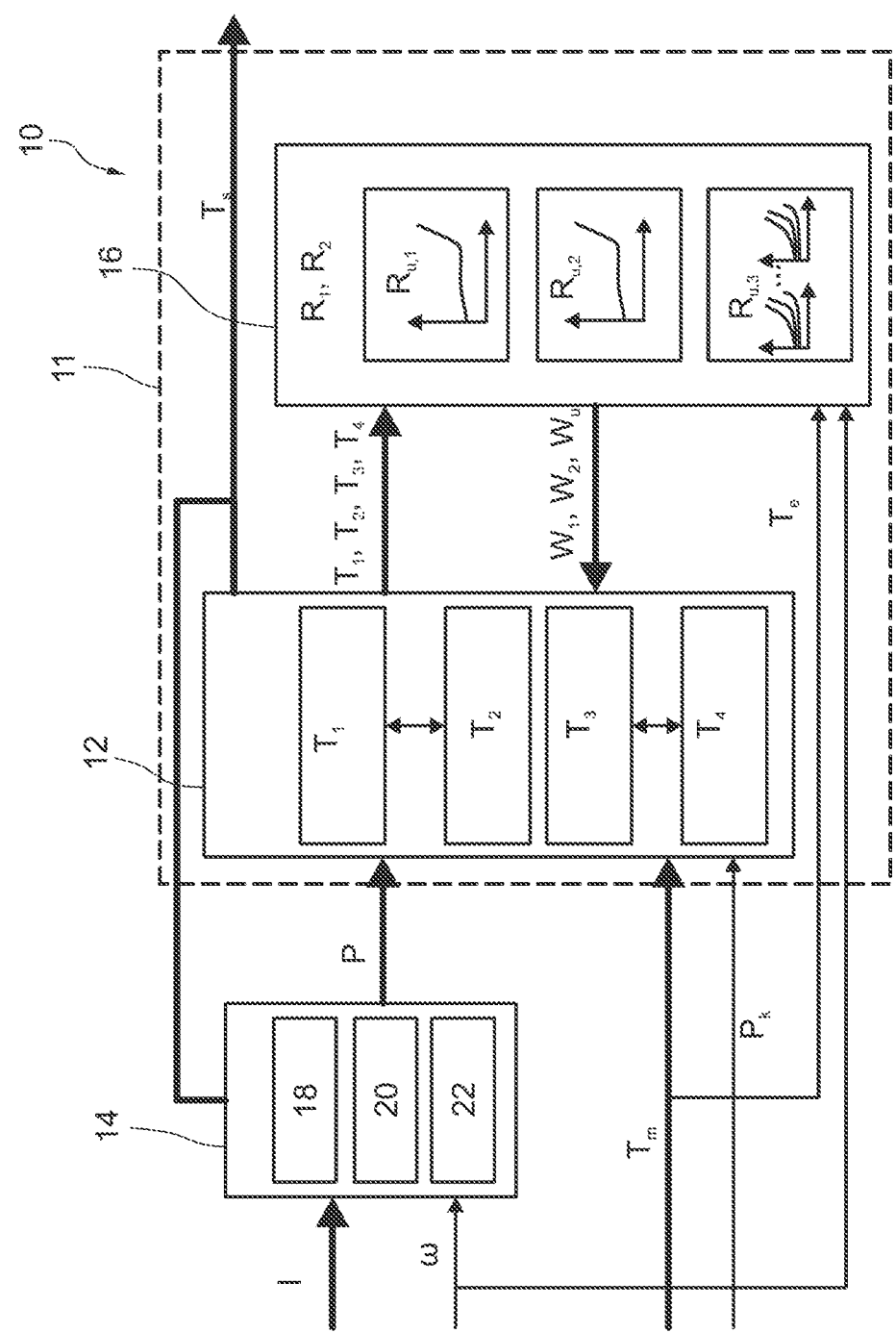
FIG. 2: shows a block diagram of a method for temperature calculation in a further special embodiment.

FIG. 2 shows a block diagram of a method 10 for temperature calculation. The input values P, for example the power losses, can depend on respective initial values, for example on an electrical current I. The power loss Pk of a clutch can also be transmitted to the first calculation module 12. The power losses of the stator 18, the rotor 20 and the power electronics 22 are calculated as input values P by the translation module 14 and transmitted to the temperature calculation 11.

During the temperature calculation 11 the input values P are processed by the first calculation module 12. For example, a first temperature detection region with a first temperature can be assigned to the stator, a second temperature detection region with a second temperature of the power electronics, a third temperature detection region with a third temperature can be assigned to the rotor and a fourth temperature detection region with a fourth temperature can be assigned to a rotor carrier accommodating the rotor. Depending upon the input values P, the first calculation module 12 calculates the first temperature value T1 of the first temperature, the second temperature value T2 of the second temperature, the third temperature value T3 of the third temperature and the fourth temperature value T4 of the fourth temperature via a linear state space model. The first calculation module 12 can thus perform an RC network model formation and/or a model order reduction from a numerical modeling, for example an FEM.

The first, second, third, and fourth temperatures are each dependent on a coupling value W that is non-linearly dependent upon the respective temperature. The coupling values W can each be a heat flow rate between the individual temperature detection regions or between the temperature detection regions and an environment. For example, a first coupling value W1 can be a heat flow rate between the first temperature detection region, here assigned to the stator, and the second temperature detection region, here assigned to the power electronics. This amount of heat flow depends on the first and second temperature values T1, T2 and on a first thermal resistance R1 between the first and second temperature detection regions. The first thermal resistance R1 can characterize the connection between the first and second temperature detection regions, which include conductor rails, for example. Correspondingly, a second coupling value W2 can be a heat flow quantity between the third temperature detection region, here assigned to the rotor, and the fourth temperature detection region, here assigned to the rotor carrier. This heat flow quantity depends on the third and fourth temperature values T3, T4 and on a second thermal resistance R2 between the third and fourth temperature detection region. The second thermal resistance R2 can characterize the connection between the third and fourth temperature detection regions.

The temperature can in turn also be dependent upon the speed. The speed is measured as speed value w and also transferred to the second calculation module. For example, the respective thermal resistance can also be expressed as a function of the speed value co via the relationship between the temperature and the speed.

A second calculation module 16 calculates the first coupling value W1 and the second coupling value W2 dependent upon the respective temperature value T1 to T4 and dependent upon the first and second thermal resistances R1, R2. The second calculation module 16 can assign the first and second coupling values W1, W2 to the respective temperature values using at least one lookup table and/or using an analytical function.

Further coupling values Wu can be calculated, each of which shows the heat flow between a temperature detection region and the environment depending upon the temperature value assigned to the temperature detection region and characterizes the thermal resistance Ru, which depends non-linearly on the temperature difference between the temperature value and the ambient temperature Te. Thus, a first heat resistance Ru,1 can represent the radial heat transfer between the rotor and the environment, a second heat resistance Ru, 2 the axial heat transfer between the rotor and the environment and a third heat resistance Ru, 3 heat transfer between the rotor carrier and the environment. A plurality of third thermal resistances Ru,3 can also be provided. The ambient temperature Te can, for example, be measured as an air temperature and provided to the second calculation module 16. The second calculation module 16 outputs the coupling values W1, W2, Wu to the first calculation module 12, which calculates and outputs the estimated temperature Ts dependent thereon.

The first calculation module 12 additionally processes a first temperature measurement Tm in a state observer according to Luenburger. A temperature calculation value determined by the first calculation module 12 is compared with the first temperature measurement Tm and the estimated temperatures Ts are adjusted and output as a function of this deviation. This coordination allows a more precise calculation of the estimated temperatures.

LIST OF REFERENCE SYMBOLS

10 Method
11 Temperature calculation
12 First calculation module
14 Translation module
16 Second calculation module
18 Stator
20 Rotor
22 Power electronics
I Current
P1 First input value
P2 Second input value
Pm Input value
Pk Power loss
R Coupling value
R12 First coupling value
R1 First thermal resistance R2 Second thermal resistance
Ru Thermal resistance
Ru,1 First thermal resistance
Ru,2 Second thermal resistance
Ru,3 Third thermal resistance
T Temperature value
T1 First temperature value
T2 Second temperature value
T3 Third temperature value
T4 Fourth temperature value
Te Ambient temperature
Tn Temperature value
Tm Temperature measurement
Ts,1 First estimated temperature
Ts,2 Second estimated temperature
Ts,n Estimated temperature
ω Speed value
W Coupling value
W1 First coupling value
W2 Second coupling value
Wu Coupling value

The invention claimed is:

1. A method for controlling an electric drive unit, the drive unit having a first temperature detection region with a first temperature and a second temperature detection region with a second temperature, the method comprising:
calculating a first temperature value of the first temperature detection region in a manner linearly dependent upon a first input value,
calculating a second temperature value of the second temperature detection region in a manner linearly dependent upon a second input value,
calculating a first coupling value in a manner non-linearly dependent upon at least the first temperature value,
according to the first and second input values and the first coupling value, calculating a first estimated temperature at the first temperature detection region and a second estimated temperature at the second temperature detection region,
then adjusting the first estimated temperature based on a deviation between the first temperature value and a first temperature measurement at the first temperature detection region; and
then controlling the electric drive unit based on the first and second estimated temperatures.

2. The method according to claim 1, wherein the first coupling value characterizes a heat flow at least with respect to the first temperature detection region.

3. The method according to claim 1, wherein the first coupling value is dependent on the first and second temperature values.

4. The method according to claim 1, wherein the first and second temperatures depend on one another via the first coupling value.

5. The method according to claim 1, wherein the first temperature detection region and the second temperature detection region are heat-effectively coupled to one another by a coupling region, and the first coupling value is a variable characterizing heat flow in the coupling region.

6. The method according to claim 1, wherein the electric drive unit has an electric motor and a power electronics system controlling said electric motor, and the first temperature detection region and the second temperature detection region are each assigned to the electric motor and/or the power electronics system.

7. An electric drive unit in a vehicle in which the temperature at a first temperature detection region and at a second temperature detection region is calculated by a method according to claim 1.

* * * * *